(12) United States Patent
Boualleg et al.

(10) Patent No.: US 10,364,158 B2
(45) Date of Patent: Jul. 30, 2019

(54) AMORPHOUS MESOPOROUS ALUMINA WITH HIGH CONNECTIVITY AND PRODUCTION METHOD THEREOF

(71) Applicant: IFP Energies Nouvelles, Rueil-Malmaison (FR)

(72) Inventors: Malika Boualleg, Villeurbanne (FR); Celine Bouvry, Rueil Malmaison (FR)

(73) Assignee: IFP Energies Nouvelles, Rueil-Malmaison (FR)

(*) Notice: Subject to any disclaimer, the term of this patent is extended or adjusted under 35 U.S.C. 154(b) by 0 days.

(21) Appl. No.: 15/318,375

(22) PCT Filed: Jun. 9, 2015

(86) PCT No.: PCT/EP2015/062828
§ 371 (c)(1),
(2) Date: Dec. 13, 2016

(87) PCT Pub. No.: WO2015/189202
PCT Pub. Date: Dec. 17, 2015

(65) Prior Publication Data
US 2017/0121180 A1    May 4, 2017

(30) Foreign Application Priority Data
Jun. 13, 2014    (FR) ..................... 14 55423

(51) Int. Cl.
| | | |
|---|---|---|
| *C01F 7/34* | (2006.01) | |
| *B01J 21/04* | (2006.01) | |
| *B01J 35/10* | (2006.01) | |
| *C04B 35/111* | (2006.01) | |
| *C04B 35/64* | (2006.01) | |
| *C04B 38/00* | (2006.01) | |
| *B01J 37/03* | (2006.01) | |
| *B01J 37/08* | (2006.01) | |
| *B01J 32/00* | (2006.01) | |
| *B01J 20/08* | (2006.01) | |
| *B01J 20/28* | (2006.01) | |
| *B01J 20/30* | (2006.01) | |
| *B01J 37/00* | (2006.01) | |
| *B01J 37/06* | (2006.01) | |

(52) U.S. Cl.
CPC ............. *C01F 7/34* (2013.01); *B01J 20/08* (2013.01); *B01J 20/28059* (2013.01); *B01J 20/28061* (2013.01); *B01J 20/28073* (2013.01); *B01J 20/3007* (2013.01); *B01J 20/3071* (2013.01); *B01J 20/3078* (2013.01); *B01J 20/3085* (2013.01); *B01J 21/04* (2013.01); *B01J 32/00* (2013.01); *B01J 35/1014* (2013.01); *B01J 35/1019* (2013.01); *B01J 35/1042* (2013.01); *B01J 35/1061* (2013.01); *B01J 37/0009* (2013.01); *B01J 37/009* (2013.01); *B01J 37/031* (2013.01); *B01J 37/036* (2013.01); *B01J 37/06* (2013.01); *B01J 37/08* (2013.01); *B01J 37/088* (2013.01); *C04B 35/111* (2013.01); *C04B 35/64* (2013.01); *C04B 38/0045* (2013.01); *C01P 2006/12* (2013.01); *C01P 2006/14* (2013.01); *C04B 2235/3201* (2013.01); *C04B 2235/3222* (2013.01); *C04B 2235/443* (2013.01); *C04B 2235/444* (2013.01); *C04B 2235/6021* (2013.01); *C04B 2235/6586* (2013.01); *C04B 2235/6588* (2013.01)

(58) Field of Classification Search
CPC ........ C01F 7/34; B01J 20/08; B01J 20/28059; B01J 20/28061; B01J 20/28073; B01J 20/3007; B01J 20/3071; B01J 20/3078; B01J 20/3085; B01J 21/04; B01J 35/1014; B01J 37/0009; B01J 37/009; B01J 37/031; B01J 37/06; B01J 37/08
See application file for complete search history.

(56) References Cited

U.S. PATENT DOCUMENTS

| | | | | |
|---|---|---|---|---|
| 2005/0101480 | A1* | 5/2005 | Ackerman | ............... B01J 21/04 502/313 |
| 2014/0367311 | A1* | 12/2014 | Yu | ............... B01J 21/12 208/213 |

FOREIGN PATENT DOCUMENTS

| | | |
|---|---|---|
| CN | 101993102 A | 3/2011 |
| GB | 967902 A | 8/1964 |

OTHER PUBLICATIONS

International Search Report dated Aug. 26, 2015 issued in corresponding PCT/EP2015/062828 application (3 pages).
English Abstract of CN 101993102 A published Mar. 30, 2011.
N.K. Renuka et al., "Mesoporous—Alumina Nanoparticles: Synthesis, Characterization and Dye Removal Efficiency", Materials Letters, vol. 82 (2012) pp. 42-44.
C. Kim et al., "Synthesis of Mesoporous Alumina by Using a Cost-Effective Template", Korean Journal of Chemical Engineering, vol. 20, No. 6 (2003) pp. 1142-1144.

\* cited by examiner

*Primary Examiner* — James A Fiorito
(74) *Attorney, Agent, or Firm* — Millen White Zelano & Branigan, PC

(57) ABSTRACT

An amorphous mesoporous alumina having a connectivity (Z) greater than 2.7 is described. The present invention also relates to the process for preparing the said alumina, comprising at least one precipitation step of at least one aluminum salt, at least one heating step of the suspension obtained, a thermal treatment step to form the alumina gel, a gentle drying step or spray drying step, a moulding step of the powder obtained, and a final thermal treatment step in order to obtain the alumina.

24 Claims, No Drawings

AMORPHOUS MESOPOROUS ALUMINA WITH HIGH CONNECTIVITY AND PRODUCTION METHOD THEREOF

TECHNICAL FIELD

The present invention relates to the preparation of an amorphous mesoporous alumina moulded from an alumina gel having a high dispersibility, the said alumina gel being obtained by precipitation of at least one aluminium salt. In particular the present invention relates to an amorphous mesoporous alumina having a very high connectivity compared to aluminas of the prior art. The present invention also relates to the process for preparing the said alumina by moulding an alumina gel, the said alumina gel being prepared according to a preparation process involving specific precipitation, enabling at least 40 wt. % of alumina with respect to the total amount of alumina formed at the end of the preparation process of the gel to be obtained as early as the first precipitation step, and the amount of alumina formed at the end of the first precipitation step may even reach 100%.

The alumina according to the invention, on account of its valuable properties particularly in terms of connectivity, may be used as a catalyst support in all refining processes as well as an adsorbent.

PRIOR ART

U.S. Pat. No. 4,676,928 describes a process for producing a water-dispersible alumina comprising a step of forming an aqueous alumina dispersion, a step of adding an acid to produce an acidic dispersion having a pH between 5 and 9, a maturation step at a high temperature greater than 70° C. for a period sufficient to convert the alumina into colloidal gel, followed by a step of drying the said obtained colloidal gel.

U.S. Pat. No. 5,178,849 describes a process for producing an alpha alumina comprising a dispersion step of an aluminium hydrate having a dispersibility less than 70%, an acidification step of the obtained dispersion at a pH below 3.5 in order to dissolve at least partially the aluminium hydrate, a hydrothermal treatment step of the obtained acidic dispersion at a temperature between 150 and 200° C., a pressure between 5 and 20 atmospheres for a period between 0.15 and 4 hours to obtain a colloidal boehmite having a dispersibility greater than 90%.

The preparation of alumina gel by precipitation is also well known in the prior art.

In particular, U.S. Pat. No. 7,790,652 describes the preparation by precipitation of an alumina support having a highly defined pore distribution, that can be used as catalyst support in a hydroconversion process of heavy hydrocarbon feedstocks.

The alumina support is prepared according to a method comprising a first step of forming an alumina dispersion by mixing, in a controlled manner, a first alkaline aqueous solution and a first acidic aqueous solution, at least one of the said acid and basic solutions, or both of them, comprising an aluminium compound. The acidic and basic solutions are mixed in proportions such that the pH of the resultant dispersion is between 8 and 11. The acidic and basic solutions are also mixed in amounts enabling a dispersion containing the desired amount of alumina to be obtained, in particular the first step enables 25 to 35 wt. % of alumina to be obtained with respect to the total amount of alumina formed at the end of the two precipitation steps. The first step is carried out at a temperature between 20 and 40° C. When the desired amount of alumina is formed the temperature of the suspension is raised to a temperature between 45 and 70° C., the heated suspension is then subjected to a second precipitation step by contacting the said suspension with a second alkaline aqueous solution and a second acidic aqueous solution, at least one of the two solutions or both solutions comprising an aluminium compound. Likewise, the pH is adjusted between 8 and 10.5 by the proportions of the added acidic and basic solutions and the remaining amount of alumina to be formed in the second step is provided by the amounts of the two added acidic and basic solutions. The second step is carried out at a temperature between 20 and 40° C. The alumina gel thereby formed includes at least 95% of boehmite. The dispersibility of the alumina gel thus obtained is not mentioned. The alumina gel is then filtered, washed, and optionally dried according to the methods known to the person skilled in the art, without a prior heat treatment step, to produce an alumina powder that is then moulded according to the methods known to the person skilled in the art, following which it is calcined to produce the final alumina support.

The first precipitation step of the preparation process of U.S. Pat. No. 7,790,652 is limited to the production of a low content alumina of between 25 and 35 wt. %, since a production of higher content alumina at the end of the first step does not allow an optimal filtration of the obtained gel. Besides, the increase in the production of alumina in the first step of the U.S. Pat. No. 7,790,652 belonging to Shell did not allow the gel that was thus obtained to be moulded.

Surprisingly the Applicant has found that a specific alumina gel having a high degree of dispersibility, prepared according to a process comprising at least one precipitation step in which at least 40 wt. % of alumina as $Al_2O_3$ equivalent with respect to the total amount of alumina formed at the end of said preparation process of the gel is formed as early as the first precipitation step, and a final heat treatment step and in particular a final ageing step, could be moulded so as to obtain an amorphous mesoporous alumina having a specific pore distribution as well as a very high connectivity.

An object of the present invention is to provide an amorphous mesoporous alumina having a very high connectivity.

Another object of the present invention is to provide a process for preparing the said alumina by moulding an alumina gel having a high dispersibility and in particular a dispersibility greater than 70% as well as a crystallite size between 2 and 35 nm.

SUMMARY AND IMPORTANCE OF THE INVENTION

The object of the present invention is an amorphous mesoporous alumina having a connectivity (Z) greater than 2.7.

An advantage of the invention is to provide an alumina whose porosity is highly connected, that is to say has a very large number of adjacent pores. A high connectivity represents an important advantage as regards the accessibility of the porosity and plays an important role both during the impregnation steps of very viscous solutions of precursors of active phases and for the diffusion of the molecules to be treated during catalytic reactions using these materials.

The object of the present invention is also a process for preparing the said alumina, the said process comprising at least the following steps:

a) at least one first alumina precipitation step, in an aqueous reaction medium, of at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid, and nitric acid, in which at least one of the basic or acidic precursor comprises aluminium, the relative flow rate of the acidic and basic precursors is chosen so as to obtain a pH of the reaction medium between 8.5 and 10.5 and the flow rate of the acidic and basic precursor or precursors containing aluminium is regulated so as to obtain a rate of progress of the said first step between 40 and 100%, the rate of progress being defined as the proportion of alumina formed as $Al_2O_3$ equivalent during the first precipitation step with respect to the total amount of alumina formed at the end of the precipitation step or steps, the said first precipitation step being carried out at a temperature between 10 and 50° C., and for a period between 2 minutes and 30 minutes, b) a heat treatment step of the suspension obtained at the end of the step a) at a temperature between 50 and 200° C. for a period between 30 minutes and 5 hours, enabling an alumina gel to be obtained, c) a filtration step of the suspension obtained at the end of the heat treatment step b), followed by at least one washing step of the obtained gel, d) a drying step of the alumina gel obtained at the end of the step c) so as to obtain a powder, e) a moulding step of the powder obtained at the end of the step d) so as to obtain a crude material, f) a heat treatment step of the crude material obtained at the end of the step e) at a temperature between 500 and 1000° C., in the presence or otherwise of a stream of air containing up to 60 vol. % of water.

An advantage of the invention is to provide a new process for preparing an amorphous mesoporous alumina that allows an alumina gel to be moulded prepared according to a process comprising at least one precipitation step in which at least 40 wt. % of alumina as $Al_2O_3$ equivalent with respect to the total amount of alumina formed at the end of the said preparation process of the gel are formed as early as the first precipitation step, thanks to the implementation of a heat treatment step and in particular an ageing step enabling an alumina gel to be obtained having an improved filterability, and facilitating its moulding.

Another advantage of the invention is to provide a new process for preparing an alumina by precipitation that may comprise a single precipitation step and is inexpensive compared to the prior art processes for preparing conventional alumina, such as for example the sol-gel type preparation processes.

Another advantage of the invention is to provide a new process for preparing the alumina according to the invention, enabling an amorphous mesoporous alumina to be obtained having a specific pore distribution as well as a very high connectivity compared to the aluminas the prior art.

DEFINITIONS AND MEASUREMENT METHODS

Throughout the following text, the dispersibility index is defined as the percentage by weight of peptised alumina gel that can be dispersed by centrifugation in a polypropylene tube at 3600 G for 10 minutes.

The dispersibility is measured by dispersing 10% of boehmite or alumina gel in a suspension of water also containing 10% of nitric acid with respect to the mass of boehmite. The suspension is then centrifuged at 3600 G rpm for 10 minutes. The collected sediments are dried at 100° C. overnight and then weighed.

The dispersibility index, denoted as DI, is obtained by the following calculation: DI (%)=100% mass of dried sediments (%).

Throughout the text the connectivity of the alumina according to the invention is defined as the number of pores adjacent to a given pore. The connectivity according to the invention is representative of the total the porosity of the alumina and in particular of the total the mesoporosity of the alumina, that is to say the total number of pores having a mean diameter between 2 and 50 nm.

The connectivity is a relative quantity measured according to the procedure described in the publication by Seaton (Liu H., Zhang L. Seaton N A, Chemical Engineering Science, 47, 17-18, pp. 4393-4404, 1992). It involves a Monte Carlo simulation from nitrogen adsorption/desorption isotherms. These connectivity parameters are based on the theory of percolation. The connectivity is related to the number of adjacent pores and represents an advantage for diffusion during catalytic reactions of the molecules to be treated.

The alumina according to the present invention furthermore has a specific pore distribution, in which the macropore and mesopore volumes are measured by mercury intrusion and the micropore volume is measured by nitrogen adsorption.

"Macropores" are understood to mean pores whose opening is greater than 50 nm. "Mesopores" are understood to mean to pores whose opening is between 2 nm and 50 nm, limits included.

"Micropores" are understood to mean pores whose opening is strictly less than 2 nm.

In the following description of the invention, the pore distribution measured by mercury porosimetry is determined by mercury intrusion porosimetry according to the ASTM standard D4284-83 at a maximum pressure of 4000 bar (400 MPa), employing a surface tension of 484 dynes/cm and a contact angle of 140°. The wetting angle was taken as equal to 140°, following the recommendations of the work "Techniques of the engineer, analytical treatise and characterisation, pp. 1050-5, by Jean Charpin and Bernard Rasneur".

The value starting from which the mercury fills all the intergranular voids is set at 0.2 MPa, and it is considered that above this value the mercury penetrates all the pores of the alumina. So as to obtain a better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (about 0.2 MPa).

The macropore volume of the catalyst is defined as being the cumulative volume of mercury introduced at a pressure between 0.2 MPa and 30 MPa, corresponding to the volume contained in the pores of apparent diameter greater than 50 nm.

The mesopore volume of the catalyst is defined as being the cumulative volume of mercury introduced at a pressure between 30 MPa and 400 MPa, corresponding to the volume contained in the pores of apparent diameter between 2 and 50 nm.

The volume of the micropores is measured by nitrogen porosimetry. The quantitative analysis of the microporosity is carried out starting from the "t" method Lippens-De Boer method, 1965), which corresponds to a transform of the starting adsorption isotherm as described in the work "Adsorption by powders and porous solids. Principles, methodology and applications" by F. Rouquerol, J. Rouquerol and K. Sing, Academic Press, 1999.

The median diameter of the mesopores (Dp in nm) is also defined as a diameter such that all the pores of a size less than this diameter make up 50% of the mesopore volume, measured by mercury porosimetry.

The pore distribution measured by nitrogen adsorption was determined by the Barrett-Joyner-Halenda (BJH) model. The nitrogen adsorption—desorption isotherm according to the BJH model is described in the journal "The Journal of the American Chemical Society," 73, 373 (1951) by E. P. Barrett, L. G. Joyner and P. P. Halenda. In the following description of the invention, the nitrogen adsorption volume is understood to mean the volume measured for $P/P_0=0.99$, the pressure at which it is accepted that the nitrogen has filled all the pores.

In the following description of the invention, the term specific surface area is understood to mean the BET specific surface determined by nitrogen adsorption in accordance with the ASTM standard D 3663-78 developed from the Brunauer-Emmett-Teller method described in the journal "The Journal of the American Chemical Society," 60, 309 (1938).

DESCRIPTION OF THE INVENTION

In accordance with the invention the amorphous mesoporous alumina has a connectivity greater than 2.7, preferably between 2.7 and 10, preferably between 2.8 and 10, particularly preferably between 3 and 9, more preferably between 3 and 8 and still more preferably between 3 and 7.

The alumina according to the present invention advantageously has a BET specific surface and a calibrated pore volume and in particular mesopore volume.

Preferably, the mesoporous alumina is free from micropores. The absence of micropores is measured and verified by nitrogen adsorption.

Preferably, the alumina advantageously has a BET specific surface between 50 and 450 $m^2/g$, preferably between 100 and 400 $m^2/g$, preferably between 150 and 400 $m^2/g$, and particularly preferably between 150 and 350 $m^2/g$.

Preferably, the alumina advantageously has a mesopore volume greater than or equal to 0.5 ml/g, preferably between 0.6 and 0.8 ml/g.

The mesopore volume is defined as being the volume contained in the pores having a mean diameter between 2 and 50 nm, limits included.

Preferably, the total pore volume of the said alumina measured by mercury porosimetry is between 0.6 and 0.9 ml/g.

Preferably the volume percentage contained in the pore of size between 2 to 50 nm with respect to the total pore volume of the said alumina is greater than 50% and is preferably between 50 and 75%.

Preferably, the volume percentage contained in the pores of size greater than 50 nm with respect to the total pore volume of the said alumina is less than 10%, and preferably less than 6%.

The median diameter of the mesopores measured by mercury porosimetry of the said alumina, determined by volume, is advantageously between 8 and 12.5 nm, and preferably between 9.0 and 12.5 nm.

Preferably, the alumina according to the invention is a non-mesostructured alumina.

Another object of the invention relates to the process for preparing the said alumina.

In accordance with the invention the said preparation process comprises at least one first alumina precipitation step a), in an aqueous reaction medium, of at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid, and nitric acid, in which at least one of the basic or acidic precursors comprises aluminium, the relative flow rate of the acidic and basic precursors is chosen so as to obtain a pH of the reaction medium between 8.5 and 10.5, and the flow rate of the acidic and basic precursor or precursors containing aluminium is regulated so as to obtain a rate of progress of the said first step between 40 and 100%, the rate of progress being defined as the proportion of alumina formed as $Al_2O_3$ equivalent during the first precipitation step a) with respect to the total amount of alumina formed at the end of the precipitation step or steps and more generally at the end of the preparation steps of the alumina gel, the said step a) being carried out at a temperature between 10 and 50° C., and for a period between 2 minutes and 30 minutes.

In general, the expression "rate of progress" of the nth precipitation step is understood to be the percentage of alumina formed as $Al_2O_3$ equivalent in the nth step, with respect to the total amount of alumina formed at the end of the set of precipitation steps and more generally at the end of the precipitation steps of the alumina gel.

In the case where the rate of progress of the said precipitation step a) is 100%, the said precipitation step a) generally enables an alumina suspension to be obtained having a concentration of $Al_2O_3$ between 20 and 100 g/l, preferably between 20 and 80 g/l, particularly preferably between 20 and 50 g/l.

Precipitation Step a)

The mixture in the aqueous reaction medium of at least one basic precursor and at least one acidic precursor requires either that at least the basic precursor or the acidic precursor contains aluminium, or that the two basic and acidic precursors contain aluminium.

The basic precursors containing aluminium are sodium aluminate and potassium aluminate. The preferred basic precursor is sodium aluminate.

The acidic precursors containing aluminium are aluminium sulphate, aluminium chloride and aluminium nitrate. The preferred acidic precursor is aluminium sulphate.

Preferably, the basic and acidic precursor or precursors are added to the said first precipitation step a) in aqueous solutions.

Preferably the aqueous reaction medium is water.

Preferably the said step a) is carried out while stirring.

Preferably, the said step a) is carried out in the absence of organic additive.

The acidic and basic precursors, whether or not they contain aluminium, are mixed, preferably in solution, in the aqueous reaction medium, in proportions such that the pH of the resultant suspension is between 8.5 and 10.5.

In accordance with the invention, it is the relative flow rate of the acidic and basic precursors that determines whether they contain aluminium or not, which is chosen so as to obtain a pH of the reaction medium between 8.5 and 10.5.

In the preferred case where the basic and acidic precursors are respectively sodium aluminate and aluminium sulphate, the mass ratio of the said basic precursor to the said acidic precursor is advantageously between 1.6 and 2.05.

For the other basic and acid precursors, whether or not they contain aluminium, the basic/acidic mass ratios are established by a neutralisation curve of the base by the acid. Such a curve is easily obtained by the person skilled in the art.

Preferably, the said precipitation step a) is carried out at a pH between 8.5 and 10 and particularly preferably between 8.7 and 9.9.

The acidic and basic precursors are also mixed in amounts enabling a suspension to be obtained containing the desired amount of alumina, depending on the final concentration of alumina to be reached. In particular the said step a) enables 40 to 100 wt. % of alumina as $Al_2O_3$ equivalent with respect to the total amount of alumina formed at the end of the precipitation step or steps, to be obtained. In accordance with the invention it is the flow rate of the acidic and basic precursors or precursors containing aluminium that is regulated so as to obtain a rate of progress of the first step between 40 and 100%.

Preferably, the rate of progress of the said precipitation step a) is between 40 and 99%, preferably between 45 and 90% and preferably between 50 to 85%. In the case where the rate of progress obtained at the end of the precipitation step a) is less than 100%, a second precipitation step is necessary so as to increase the amount of alumina formed. In the case where a second precipitation step implemented, the rate of progress is defined as being the proportion of alumina formed as $Al_2O_3$ equivalent during the said precipitation step a) with respect to the total amount of alumina formed at the end of the two precipitation steps of the preparation process according to the invention and more generally at the end of the preparation steps of the alumina gel.

Thus, depending on the intended concentration of alumina at the end of the precipitation step or steps, preferably between 20 and 100 g/l, the amounts of aluminium that have to be provided by the acidic and/or basic precursors are calculated and the flow rate of the precursors is regulated depending on the aluminium concentration of the said added precursors, on the amount of water added to the reaction medium, and on the rate of progress required for the precipitation step or steps.

The flow rates of the acidic and/or basic precursor or precursors containing aluminium depend on the size of the reactor used and thus on the amount of water added to the reaction medium.

Preferably, the said precipitation step a) is carried out at a temperature between 10 and 45° C., preferably between 15 and 45° C., particularly preferably between 20 and 45° C. and most preferably between 20 and 40° C.

It is important that the said precipitation step a) is carried out at low temperature. In the case where the said preparation process according to the invention comprises two precipitation steps, the precipitation step a) is advantageously carried out at a temperature lower than the temperature of the second precipitation step.

Preferably the said precipitation step a) is carried out for a period between 5 and 20 minutes, preferably of 5 to 15 minutes.

Heat Treatment Step b)

In accordance with the invention the said preparation process comprises a heat treatment step b) of the suspension obtained at the end of the precipitation step a), the said heat treatment step being carried out at a temperature between 60 and 200° C. for a period between 30 minutes and 5 hours, in order to obtain the alumina gel.

Preferably the said heat treatment step b) is an ageing step.

Preferably the said heat treatment step b) is carried out at a temperature between 65 and 150° C., preferably between 65 and 130° C., preferably between 70 and 110° C., and particularly preferably between 70 and 95° C.

Preferably the said heat treatment step b) is carried out for a period between 40 minutes and 5 hours, preferably between 40 minutes and 3 hours and particularly preferably between 45 minutes and 2 hours.

Optional Second Precipitation Step

According to a preferred embodiment, in the case where the rate of progress obtained at the end of the precipitation step a) is less than 100%, the said preparation process preferably includes a second precipitation step a') after the first precipitation step.

The said second precipitation step enables the amount of alumina produced to be increased. The said second precipitation step a') is advantageously carried out between said first precipitation step a) and the heat treatment step b).

In the case where a second precipitation step is carried out, a heating step of the suspension obtained at the end of the precipitation step a) is advantageously carried out between the two precipitation steps a) and a').

Preferably the said heating step of the suspension obtained at the end of the step a), carried out between the said step a) and the second precipitation step a'), is performed at a temperature between 20 and 90° C., preferably between 30 and 80° C., particularly preferably between 30 and 70° C. and even more preferably between 40 and 65° C.

Preferably the said heating step is carried out for a period between 7 and 45 minutes and preferably between 7 and 35 minutes.

The said heating step is advantageously carried out according to all the heating methods known to the person skilled in the art.

According to the said preferred embodiment, the said preparation process comprises a second precipitation step of the suspension obtained at the end of the heating step, the said second step being carried out by adding to the said suspension at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid, and nitric acid, in which at least one of the basic or acidic precursors contains aluminium, the relative flow rate of the acidic and basic precursors is chosen so as to obtain a pH of the reaction medium between 8.5 and 10.5 and the flow rate of the acidic and basic precursor or precursors containing aluminium is regulated so as to obtain a rate of progress of the second step between 0 and 60%, the rate of progress being defined as the proportion of alumina formed as $Al_2O_3$ equivalent during the said second precipitation step with respect to the total amount of alumina formed at the end of the two precipitation steps, more generally at the end of the preparation steps of the alumina gel and preferably at the end of the step a') of the preparation process according to the invention, the said step being carried out at a temperature between 40 and 90° C., and for a period between 2 minutes and 50 minutes.

As in the first precipitation step a), the addition to the heated suspension of at least one basic precursor and at least one acidic precursor requires either that at least the basic precursor or the acidic precursor contains aluminium, or that the two basic and acidic precursors contain aluminium.

The basic precursors containing aluminium are sodium aluminate and potassium aluminate. The preferred basic precursor is sodium aluminate.

The acidic precursors containing aluminium are aluminium sulphate, aluminium chloride and aluminium nitrate. The preferred acidic precursor is aluminium sulphate.

Preferably the said second precipitation step is carried out while stirring.

Preferably the said second step is carried out in the absence of organic additive.

The acidic and basic precursors, whether or not they contain aluminium, are mixed, preferably in solution, in the aqueous reaction medium, in proportions such that the pH of the resultant suspension is between 8.5 and 10.5.

Preferably the basic and acidic precursor or precursors are added in the second precipitation step a') in aqueous solutions.

As in the precipitation step a), it is the relative flow rate of acidic and basic precursors that determines whether they contain aluminium or not, which is chosen so as to obtain a pH of the reaction medium between 8.5 and 10.5.

In the preferred case where the basic and acidic precursors are respectively sodium aluminate and aluminium sulphate, the mass ratio of the said basic precursor to the said acid precursor is advantageously between 1.6 and 2.05.

For the other basic and acid precursors, whether or not they contain aluminium, the base/acid mass ratios are determined by a neutralisation curve of the base by the acid. Such a curve is easily obtained by the person skilled in the art.

Preferably the said second precipitation step is carried out at a pH between 8.5 and 10 and preferably between 8.7 and 9.9.

The acidic and basic precursors are also mixed in amounts enabling a suspension to be obtained containing the desired amount of alumina, depending on the final concentration of alumina to be reached. In particular, the said second precipitation step enables 0 to 60 wt. % of alumina in $Al_2O_3$ equivalent with respect to the total amount of alumina formed at the end of the two precipitation steps and preferably at the end of the step a'), to be obtained.

As in the precipitation step a), it is the flow rate of the acidic and basic precursor or precursors containing aluminium that is regulated so as to obtain a rate of progress of the second step between 0 and 60%, the rate of progress being defined as the proportion of alumina formed as $Al_2O_3$ equivalent during the said second precipitation step with respect to the total amount of alumina formed at the end of the two precipitation steps of the process according to the invention and preferably at the end of the step a').

Preferably, the rate of progress of the said second precipitation step a) is between 1 and 60, preferably between 10 and 55% and particularly preferably between 15 to 55%.

Thus, depending on the envisaged alumina concentration at the end of the precipitation step or steps, preferably between 20 and 100 g/l, the amounts of aluminium that have to be provided by the acidic and/or basic precursors are calculated and the flow rate of the precursors is adjusted depending on the concentration of the said added aluminium precursors, on the amount of water added to the reaction medium and on the required rate of progress for each of the precipitation steps.

As in the precipitation step a), the flow rates of the acidic and/or basic precursors containing aluminium depend on the size of the reactor used and thus on the amount of water added to the reaction medium.

By way of example, if a 3 liter reactor is used and 1 liter of alumina suspension of final $Al_2O_3$ concentration of 50 g/l is desired, then the target rate of progress is 50% as $Al_2O_3$ equivalent for the first precipitation step. Thus, 50% of the total alumina should be provided during the precipitation step a). The alumina precursors are sodium aluminate at a concentration of 155 g/l $Al_2O_3$ and aluminium sulphate at a concentration of 102 g/l $Al_2O_3$. The precipitation pH of the first step is set at 9.5 and of the second step at 9. The amount of water added to the reactor is 622 ml.

For the first precipitation step a) carried out at 30° C. and for 8 minutes, the flow rate of aluminium sulphate should be 10.5 ml/min and the flow rate of sodium aluminate is 13.2 ml/min. The mass ratio of sodium aluminate to aluminium sulphate is thus 1.91.

For the second precipitation step, carried out at 70° C. for 30 minutes, the flow rate of aluminium sulphate should be 2.9 ml/min and the flow rate of sodium aluminate is 3.5 ml/min. The mass ratio of sodium aluminate to aluminium sulphate is thus 1.84.

Preferably the second precipitation step is carried out at a temperature between 40 and 80° C., particularly preferably between 45 and 70° C. and even more preferably between 50 and 70° C.

Preferably the second precipitation step is carried out for a period of between 5 and 45 minutes, and particularly preferably 7 to 40 minutes.

The second precipitation step generally enables an alumina suspension to be obtained having a concentration of $Al_2O_3$ between 20 and 100 g/l, preferably between 20 and 80 g/l, particularly preferably between 20 and 50 g/l.

In the case where the said second precipitation step is carried out, the said preparation process also advantageously includes a second heating step of the suspension obtained at the end of the said second precipitation step at a temperature between 50 and 95° C. and preferably between 60 and 90° C.

Preferably the said second heating step is carried out for a period between 7 and 45 minutes.

The said second heating step is advantageously carried out according to all the heating methods known to the person skilled in the art.

The said second heating step enables the temperature of the reaction medium to be increased before subjecting the suspension obtained to the heat treatment step b).

Filtration Step c)

In accordance with the invention the process for preparing alumina according to the invention also includes a filtration step c) of the suspension obtained at the end of the heat treatment step b), followed by at least one washing step of the gel obtained. The said filtration step is carried out according to the methods known to the person skilled in the art.

The filterability of the suspension obtained at the end of the precipitation step a) or at the end of the two precipitation steps is improved by the presence of the final heat treatment step b) of the obtained suspension, the said heat treatment step promoting the productivity of the process according to the invention as well as the scaling-up of the process to an industrial level.

The said filtration step is advantageously followed by at least one washing step with water and preferably one to three washing steps, with an amount of water equal to the amount of filtered precipitate.

The sequence of the steps a) and c) and optionally the second precipitation step, the second heating step and the optional filtration step, enables a specific alumina to be obtained having a dispersibility index greater than 70%, a crystallite size between 1 and 35 nm as well as a sulphur content between 0.001% and 2 wt. % and a sodium content between 0.001% and 2 wt. %, the weight percentages being expressed with respect to the total mass of the alumina gel.

The alumina gel thus obtained has a dispersibility index between 70 and 100%, preferably between 80 and 100%, particularly preferably between 85 and 100% and most preferably between 90 and 100%.

Preferably the alumina gel thus obtained has a crystallite size between 2 to 35 nm. Preferably the alumina gel thus obtained has a sulphur content between 0.001% and 1 wt. %, preferably between 0.001 and 0.40 wt. %, particularly preferably between 0.003 and 0.33 wt. %, and most preferably between 0.005 and 0.25 wt. %.

Preferably the alumina gel thus obtained has a sodium content between 0.001% and 1 wt. %, preferably between 0.001 and 0.15 wt. %, particularly preferably between 0.0015 and 0.10 wt. % and 0.002 to 0.040 wt. %.

In particular the alumina gel or the boehmite in the form of powder according to the invention is composed of crystallites whose size obtained by the Scherrer X-ray diffraction formula is between 2 and 20 nm and between 2 and 35 nm along the [120] and [020] crystallographic directions respectively.

Preferably the alumina gel according to the invention has a crystallite size along the [020] crystallographic direction of between 2 and 15 nm and a crystallite size along the [120] crystallographic direction of between 2 and 35 nm.

X-ray diffraction on the alumina gels or boehmites was carried out using the conventional powder method by means of a diffractometer.

The Scherrer formula is a formula used in X-ray diffraction of powders or polycrystalline samples that connects the mid-height size of the diffraction peaks to the size of the crystallites. It is described in detail in the reference: Appl. Cryst. (1978). 11, 102-113 Scherrer after sixty years: A survey and some new results in the determination of crystallite size, J. I. Langford and A. J. C. Wilson.

The alumina gel thus prepared and having a high dispersibility index facilitates the moulding step of the said gel according to all the methods known to the person skilled in the art and in particular by kneading extrusion, by granulation, and by the so-called oil drop technique (according to the English terminology).

Drying Step d)

In accordance with the invention the alumina gel obtained at the end of the filtration step c) is dried in a drying step d) in order to obtain a powder.

The said drying step is advantageously carried out at a temperature between 20 and 50° C. and for a period of between 1 day and 3 weeks, or by spraying.

In the case where the said drying step d) is carried out at a temperature between 20 and 50° C. and for a period of between 1 day and 3 weeks, the said drying step d) may advantageously be carried out in a closed and ventilated oven. Preferably the said drying step is carried out at a temperature between 25 and 40° C., and for a period of between three days and two weeks.

In the case where the said drying step d) is carried out by spraying, the cake obtained at the end of the heat treatment step, optionally followed by a filtration step, is re-suspended. The said suspension is then atomised into fine droplets, in a vertical cylindrical vessel in contact with a current of hot air so as to evaporate the water according to the principle well known to the person skilled in the art. The powder obtained is entrained by the heat flow and conveyed to a cyclone or a bag filter that separates the air from the powder. Preferably, in the case where the said drying step d) is carried out by spraying, the spraying is performed according to the procedure described in the publication Asep Bayu Dani Nandiyanto, Kikuo Okuyama, Advanced Powder Technology, 22, 1-19, 2011.

Moulding Step e)

In accordance with the invention, the powder obtained at the end of the drying step d) is moulded in a step e) in order to obtain a crude material.

The term crude material is understood to mean the moulded material that has not been subjected to heat treatment stages.

Preferably the said moulding step e) is carried out by kneading extrusion, by pelleting, by the oil drop coagulation method, by rotating plate granulation or by any other method well known to the person skilled in the art.

Particularly preferably, the said moulding step e) is carried out by kneading extrusion.

Heat Treatment Step f)

In accordance with the invention the crude material obtained at the end of the moulding step e) then undergoes a heat treatment step f) at a temperature between 500 and 1000° C., for a period of between 2 and 10 hours in the presence or otherwise of an stream of air containing up to 60 vol. % of water.

Preferably the said heat treatment step f) is carried out at a temperature between 540° C. and 850° C.

Preferably the said heat treatment step f) is carried out for a period of between 2 hours and 10 hours.

The said heat treatment step f) enables the boehmite to be converted to the final alumina.

The preparation process according to the invention enables an amorphous mesoporous alumina to be obtained having a connectivity greater than 2.7 and a controlled mesoporosity, exhibiting a good thermal and chemical stability, having a focussed, uniform and controlled size distribution of the mesopores, and a specific surface and a pore volume and in particular calibrated mesopores. The mesoporous alumina prepared according to the process of the invention is free of micropores. It advantageously has a BET specific surface between 50 and 450 $m^2/g$ and a mesopore volume greater than or equal to 0.5 ml/g, preferably between 0.6 and 0.8 ml/g.

The invention is illustrated by the following examples, which are in no case meant to restrict the scope of the invention.

EXAMPLES

Example 1: (Comparison)

A Pural SB3 commercial boehmite is used in the form of powder. The moulding of the powder is carried out in a first step by an acidic kneading, with an acidic aqueous solution (Ta: nitric acid content of 3 wt. %/dry mass introduced in the kneading) for 0 to 60 minutes.

This is followed by a basic kneading to neutral pH (Tb: 50 wt. %/$HNO_3$). The paste obtained is extruded through a three-lobed 2 mm die. The extrudates obtained are dried at 100° C. overnight and then calcined for 2 h at 600° C.

| | Starting gel Commercial powder |
|---|---|
| $S_{BET}$ (m²/g) | 191 |
| VPT Hg (ml/g) | 0.51 |
| Dp (Hg) (nm) | 10.4 |
| Z | 2.3 |

Example 2 (Comparison)

An alumina gel is synthesised according to a preparation process not in accordance with the invention, in which the preparation process according to Example 2 does not include a heat treatment step of the suspension obtained at the end of the precipitation steps and in which the first precipitation step a) does not produce an amount of alumina greater than 40% with respect to the total amount of alumina formed at the end of the second precipitation step. Example 2 is carried out according to the preparation procedure described in U.S. Pat. No. 7,790,562.

The synthesis is carried out in a 7 L reactor and a final suspension of 5 L in 2 precipitation steps. The amount of water added to the reactor is 3868 ml.

The desired final alumina concentration is 30 g/l.

A first co-precipitation step of aluminium sulphate $Al_2(SO_4)$ and sodium aluminate NaAlOO is carried out at 30° C. and pH=9.3 for a period of 8 minutes. The concentrations of the aluminium precursors used are the following: $Al_2(SO_4)$=102 g/l $Al_2O_3$ and NaAlOO 155 g/l $Al_2O_3$. Stirring is at 350 rpm throughout the synthesis.

A solution of aluminium sulphate $Al_2(SO_4)$ is added continuously over 8 minutes at a flow rate of 19.6 ml/min to a solution of sodium aluminate NaAlOO according to a base/acid mass ratio=1.80 so to adjust the pH to a value of 9.3. The temperature of the reaction medium is maintained at 30° C.

A suspension containing an alumina precipitate is obtained.

Since the desired final alumina concentration is 30 g/l, the flow rate of the precursors aluminium sulphate $Al_2(SO_4)$ and sodium aluminate NaAlOO containing the aluminium introduced in the first precipitation step are respectively 19.6 ml/min and 23.3 ml/min.

These flow rates of acidic and basic precursors containing aluminium enable a rate of progress of 30% to be obtained at the end of the first precipitation step.

The suspension obtained then undergoes a rise in temperature from 30 to 57° C.

A second co-precipitation step of the suspension obtained is then carried out by adding aluminium sulphate $Al_2(SO_4)$ in a concentration of 102 g/l $Al_2O_3$ and sodium aluminate NaAlOO in a concentration of 155 g/l $Al_2O_3$. A solution of aluminium sulphate $Al_2(SO_4)$ is therefore added continuously to the heated suspension obtained at the end of the first precipitation step for 30 minutes at a flow rate of 12.8 ml/min to a solution of sodium aluminate NaAlOO according to a base/acid mass ratio=1.68, so as to adjust the pH to a value of 8.7. The temperature of the reaction medium in the second step is maintained at 57° C.

A suspension containing an alumina precipitate is obtained.

Since the desired final alumina concentration is 30 g/l, the flow rates of the precursors aluminium sulphate $Al_2(SO_4)$ and sodium aluminate NaAlOO containing aluminium introduced in the second precipitation step are respectively 12.8 ml/min and 14.1 ml/min. These flow rates of acidic and basic precursors containing aluminium enable a rate of progress of 70% to be obtained at the end of the second precipitation step.

The suspension thus obtained does not undergo an ageing step.

The suspension obtained is then filtered by displacement of air in a fritted Buchner funnel and the alumina gel obtained is washed 3 times with 5 l of distilled water at 70° C. The filtration and washing time is 4 hours.

The characteristics of the alumina gel thus obtained are summarised in Table 2.

TABLE 2

Characteristics of the alumina gel obtained according to Example 2.

| | Example 2 |
|---|---|
| Dispersibility index Ta = 10% (%) | 60 |
| Size (020) (nm) | 2.9 |
| Size (120) (nm) | 4.1 |
| Sodium Na (ppm) | 0.011 |
| Sulphur S (ppm) | 0.057 |
| Filtration time | 4 h |

The alumina gel is then dried by spraying at an inlet temperature of 250° C. and outlet temperature of 130° C.

The dried alumina gel is added to a Brabender-type kneader. Water acidified with nitric acid to a total acid content of 3%, expressed by weight with respect to the mass of dried gel introduced to the kneader, is added in 5 minutes while kneading at 20 rpm. The acidic kneading is continued for 15 minutes. A neutralisation step is then carried out by adding an ammoniacal solution to the kneader, to 50% degree of neutralisation, expressed in weight of ammonia with respect to the amount of nitric acid added to the kneader for the acidification step. The kneading is continued for 3 minutes.

The paste obtained is then extruded through a three-lobed 2 mm die. The extrudates obtained are dried at 100° C. overnight and then calcined for 2 h at 600° C.

The characteristics of the moulded alumina are shown in Table 3:

TABLE 3

Characteristics of the alumina obtained according to Example 2.

| | Example 2 |
|---|---|
| $S_{BET}$ (m²/g) | 230 |
| VPT (Hg) (ml/g) | 0.78 |
| Dp (Hg) (nm) | 11.9 |
| Z | 2.5 |

Example 3 (Comparison)

Alumina is synthesised according to a preparation process not in accordance with the invention, in which the precipitation step is carried out at high temperature, that is to say at a temperature of 60° C. Stirring takes place at 350 rpm throughout the synthesis.

The synthesis is carried out in a 5 l reactor and includes a single precipitation step and an ageing step of the obtained suspension.

The desired final alumina concentration is 50 g/l.

A precipitation step of aluminium sulphate $Al_2(SO_4)$ and sodium aluminate NaAlOO is carried out at 60° C. and pH=10.2 for a period of 20 minutes. The concentrations of the aluminium precursors used are as follows: $Al_2(SO_4)$= 102 g/l $Al_2O_3$ and NaAlOO to 155 g/l $Al_2O_3$.

A solution of aluminium sulphate $Al_2(SO_4)$ is added continuously over 30 minutes at a flow rate of 25.9 ml/min to a solution of sodium aluminate NaAlOO according to a base/acid mass ratio=2.0 so to adjust the pH to a value of 10.2. All the precursors are contacted at a temperature of 60° C.

A suspension containing an alumina precipitate is obtained.

Since the desired final alumina concentration is 50 g/l, the flow rates of the precursors aluminium sulphate $Al_2(SO_4)$ and sodium aluminate NaAlOO containing aluminium introduced in the first precipitation step are respectively 25.9 ml/min and 34.1 ml/min.

These flow rates of acidic and basic precursors containing aluminium enable a rate of progress of 100% to be achieved at the end of the first precipitation step.

The suspension obtained then undergoes a rise in temperature from 60 to 90° C.

The suspension next undergoes an ageing step in which it is kept at 90° C. for 60 minutes.

The suspension obtained is then filtered by displacement of water in a fritted Buchner filter and the alumina gel obtained is washed 3 times with 3.5 l of distilled water at 70° C. The filtration and washing time is 3 hours.

The characteristics of the alumina gel thereby obtained are summarised in Table 4.

TABLE 4

| Characteristics of the alumina gel obtained according to Example 3. | |
|---|---|
| | Example 3 |
| Dispersibility index Ta (10% (%)) | 0 |
| Size (020) (nm) | 2.9 |
| Size (120) (nm) | 3.4 |
| Sodium Na (%) | 0.0068 |
| Sulphur S (%) | 0.042 |
| Filtration time | 3 h |

The alumina gel is then dried by spraying at an inlet temperature of 250° C. and outlet temperature of 130° C.

The dried alumina gel is then added to a Brabender-type kneader. Water acidified with nitric acid to a total acid content of 3%, expressed by weight with respect to the mass of dried gel added to the kneader, is added in 5 minutes while kneading at 20 rpm. The acidic kneading is continued for 15 minutes.

No cohesive paste was obtained. No alumina extrudate could therefore be obtained and the measurement of the connectivity could not be carried out.

Example 3 not in accordance with the invention demonstrates the importance of carrying out the precipitation step at low temperature and in particular during the first precipitation step. Thus, a precipitation step carried out at a temperature of 70° C., outside the claimed ranges, does not enable a dispersible gel to be obtained. On the contrary, the 10% dispersion of the alumina gel thus obtained in a suspension of water also containing 10% of nitric acid with respect to the mass of alumina gel, followed by centrifugation of the suspension at 3600 G for 10 minutes, leads to 100% of sediments.

Thus, the preparation process according to Example 3 carried out at a high temperature in the precipitation step does not allow the alumina gel obtained to be moulded and therefore does not enable alumina extrudates to be obtained.

Example 4 (According to the Invention)

An alumina is synthesised according to a preparation process in accordance with the invention in a 7 l reactor and a final suspension of 5 L in three steps, namely two precipitation steps followed by an ageing step.

The desired final alumina concentration is 45 g/l. The amount of water added to the reactor is 3267 ml. Stirring is performed at 350 rpm throughout the synthesis.

A first co-precipitation step in water, of aluminium sulphate $Al_2(SO_4)$ and sodium aluminate NaAlOO is carried out at 30° C. and pH=9.5 for a period of 8 minutes. The concentrations of the aluminium precursors used are as follows: $Al_2(SO_4)$=102 g/l $Al_2O_3$ and NaAlOO 155 g/l $Al_2O_3$.

A solution of aluminium sulphate $Al_2(SO_4)$ is added continuously over 8 minutes at a flow rate of 69.6 ml/min to a solution of sodium aluminate NaAlOO at a flow rate of 84.5 ml/min according to a base/acid mass ratio=1.84 so as to adjust the pH to a value of 9.5. The temperature of the reaction medium is maintained at 30° C.

A suspension containing an alumina precipitate is obtained.

Since the desired final alumina concentration is 45 g/l, the flow rates of the precursors aluminium sulphate $Al_2(SO4)$ and sodium aluminate NaAlOO containing the aluminium introduced in the first precipitation step are respectively 69.6 ml/min and 84.5 ml/min.

These flow rates of acidic and basic precursors containing aluminium enable a rate of progress of 72% to be obtained at the end of the first precipitation step.

The suspension obtained then undergoes a rise in temperature from 30 to 68° C.

A second co-precipitation step of the suspension obtained is then carried out by adding aluminium sulphate $Al_2(SO_4)$ in a concentration of 102 g/l $Al_2O_3$ and sodium aluminate NaAlOO in a concentration of 155 g/L of $Al_2O_3$. A solution of aluminium sulphate $Al_2(SO_4)$ is therefore continuously added to the heated suspension obtained at the end of the first precipitation step for 30 minutes at a flow rate of 7.2 ml/min to a solution of sodium aluminate NaAlOO according to a base/acid mass ratio=1.86 so as to adjust the pH to a value of 9. The temperature of the reaction medium in the second step is maintained at 68° C.

A suspension containing an alumina precipitate is obtained.

Since the desired final alumina concentration is 45 g/L, the flow rate of the precursors aluminium sulphate $Al_2(SO_4)$ and sodium aluminate NaAlOO containing the aluminium introduced in the second precipitation step are respectively 7.2 ml/min and 8.8 ml/min.

These flow rates of acidic and basic precursors containing aluminium enable a rate of progress of 28% to be obtained at the end of the second precipitation step.

The suspension obtained then undergoes a rise in temperature from 68 to 90° C.

The suspension is then subject to a heat treatment step in which it is maintained at 90° C. for 60 minutes.

The suspension obtained is then filtered by displacement of water in a fritted Buchner funnel and the alumina gel obtained is washed 3 times with 5 l of distilled water. The filtration and washing times are 3 hours.

The characteristics of the alumina gel thus obtained are summarised in Table 5.

TABLE 5

Characteristics of the alumina gel
obtained according to Example 4.

|  | Example 4: |
|---|---|
| Dispersibility index Ta = 10% (%) | 100 |
| Size (020) (nm) | 2.8 |
| Size (120) (nm) | 3.5 |
| Sodium Na (%) | 0.074 |
| Sulphur S (%) | 0.0364 |
| Filtration time | 3 h |

A gel having a dispersibility index of 100% is thus obtained.

The alumina gel obtained is then dried by spraying at an inlet temperature of 250° C. and outlet temperature of 130° C. The gel dried by spraying is called Gel No. 1.

The alumina gel obtained according to Example 4 was also dried in a ventilated oven at 35° C. for 4 days. The gel dried in the oven is called Gel No. 2.

The dried alumina gels No. 1 and No. 2 are then added respectively to a Brabender-type kneader. Water acidified with nitric acid to a total acid content of 3%, expressed in weight with respect to the mass of dried gel added to the kneader, is added in 5 minutes, while kneading at 20 rpm. The acidic kneading is continued for 15 minutes. A neutralisation step is then carried out by adding an ammoniacal solution to the kneader, to 50% degree of neutralisation, expressed in weight of ammonia with respect to the amount of nitric acid introduced to the kneader for the acidification step. The kneading is continued for 3 minutes. The paste obtained is then extruded through a 3-lobed 2 mm die. The extrudates obtained are dried at 100° C. overnight and then calcined for 2 hours at 600° C.

The characteristics of the moulded alumina are shown in Table 6:

TABLE 6

Characteristics of the alumina gel
obtained according to Example 4.

| Gel | No 1 | No 2 |
|---|---|---|
| Drying time | Spraying | 35° C. |
| $S_{BET}$ (m²/g) | 289 | 292 |
| VPT (Hg) (ml/g) | 0.68 | 0.69 |
| Dp (Hg) (nm) | 9.7 | 9.8 |
| Z | 6.5 | 6 |

The heat treatment of the gel obtained according to the preparation process in accordance with the invention allows a good filterability of the gel, that is to say a filtration time compatible with a scaling up of the process to an industrial level, thereby allowing a better productivity of the said process.

Furthermore, the preparation process according to the invention enables an alumina gel to be moulded in which 70 wt. % of alumina with respect to the total amount of alumina formed at the end of the said preparation process are formed as early as the precipitation step.

The alumina extrudates obtained have a very high connectivity regardless of the drying method that is used.

Example 5 (Comparison)

Example 5, not in accordance with the invention, is carried out in the same way and under the same operating conditions as Example 4 according to the invention, except that the suspension obtained at the end of the second precipitation step does not undergo an ageing step.

The suspension obtained at the end of the second precipitation step is filtered by displacement of water in a fritted Buchner funnel and the alumina gel obtained is washed 3 times with 3.5 l of distilled water.

The filtration and washing time is 24 hours.

The characteristics of the alumina gel thereby obtained are summarised in Table 7.

TABLE 7

Characteristics of the alumina gel
obtained according to Example 5.

|  | Example 5: |
|---|---|
| Dispersibility index Ta = 10% (%) | 100 |
| Size (020) (nm) | 2.8 |
| Size (120) (nm) | 3.5 |
| Sodium Na (%) | 0.442 |
| Sulphur S (%) | 0.0284 |
| Filtration temperature | 24 h |

The alumina gel thereby obtained could not be moulded. In fact, drying in an oven at 120° C. leads to a powder that is impossible to mould by kneading extrusion or by the oil drop method.

Example 5, not in accordance with the invention, shows the importance of implementing the heat treatment step between the precipitation step and the drying step of the gel obtained.

The invention claimed is:

1. A process for preparing amorphous mesoporous alumina, said process consisting of:
   a) a first alumina precipitation step, in an aqueous reaction medium, of at least one basic precursor selected from sodium aluminate, potassium aluminate, ammonia, sodium hydroxide and potassium hydroxide, and at least one acidic precursor selected from aluminum sulphate, aluminum chloride, aluminum nitrate, sulphuric acid, hydrochloric acid, and nitric acid, in which at least one of the basic or acidic precursor comprises aluminum, the relative flow rate of the acidic and basic precursors is chosen so as to obtain a pH of the reaction medium between 8.5 and 10.5, and the flow rate of the acidic and basic precursor or precursors containing aluminum is regulated so as to obtain a rate of progress between 40 and less than 100%, the rate of progress being defined as the proportion of alumina formed as $Al_2O_3$ equivalent during the first precipitation step with respect to the total amount of alumina formed at the end of a second precipitation step a'), the first precipitation step a) being carried out at a temperature between 10 and 40° C. and for a period between 2 minutes and 30 minutes, wherein the first precipitation step a) produces a suspension,
   wherein the second precipitation step a') is performed after the first precipitation step, and, between the first and second precipitation steps a) and a') the suspension obtained at the end of first precipitation step a) is heated in an intermediate heating step carried out at a temperature between 20 and 90° C. and for a period of between 7 and 45 minutes, and
   said second precipitation step a') is performed on the suspension obtained at the end of the intermediate heating step by adding to the said suspension obtained at the end of the intermediate heating step at least one basic precursor selected from sodium aluminate, potassium aluminate, ammonia, sodium hydroxide and potassium hydroxide and at least one acidic precursor selected from aluminum sulphate, aluminum chloride, aluminum nitrate, sulphuric acid, hydrochloric acid, and nitric acid, in which at least one of the basic or acidic precursors contains aluminum, the relative flow rate of the acidic and basic precursors is chosen so as to obtain a pH of the reaction medium between 8.5 and 10.5 and the flow rate of the acidic and basic precursor or precursors containing aluminum is regulated so as to obtain a rate of progress of second precipitation step a') between 0 and 60%, the rate of progress of second precipitation step a') being defined as the proportion of alumina formed as $Al_2O_3$ equivalent during the second precipitation step a') with respect to the total amount of alumina formed at the end of second precipitation step a'), second precipitation step a') being carried out at a temperature between 40 and 90° C., and for a period of between 2 minutes and 50 minutes,
- b) a heat treatment step wherein the suspension obtained at the end of second precipitation step a') is heated at a temperature between 50 and 200° C. for a period between 30 minutes and 5 hours,
- c) a filtration step wherein the suspension obtained at the end of the heat treatment step b) is filtered and an alumina gel is obtained, followed by at least one washing step of the obtained gel,
- d) a drying step wherein the alumina gel obtained at the end of the step c) is dried to obtain a powder,
- e) a molding step wherein the powder obtained at the end of the step d) is molded to obtain crude material, and
- f) a heat treatment step wherein the crude material obtained at the end of the step e) is heated at a temperature between 500 and 1000° C., in the presence or otherwise of a stream of air containing up to 60% by volume of water.

2. The process according to claim 1, in which the basic precursor is sodium aluminate.

3. The process according to claim 1, in which the acidic precursor is aluminum sulphate.

4. The process according to claim 1, in which the mass ratio of said basic precursor to said acidic precursor is between 1.6 and 2.05.

5. The process according to claim 1, in which the rate of progress of said first precipitation step a) is between 45 and 90%.

6. The process according to claim 1, in which the mass ratio of said basic precursor to said acidic precursor is between 1.6 and 2.05, the basic and acidic precursors being, respectively, sodium aluminate and aluminum sulphate.

7. The process according to claim 1, in which the second precipitation step a') is carried out at a temperature between 45 and 70° C.

8. The process according to claim 1, wherein first precipitation step a) is carried out at a pH between 8.5 and 10.

9. The process according to claim 1, wherein the rate of progress of first precipitation step a) is between 40 and 99%.

10. The process according to claim 1, wherein the first precipitation step a) is carried out at a temperature lower than the temperature of the second precipitation step a').

11. The process according to claim 1, wherein the first precipitation step a) is carried out for a period between 5 and 20 minutes.

12. The process according to claim 1, wherein heat treatment step b) is carried out at a temperature between 65 and 150° C.

13. The process according to claim 1, wherein heat treatment step b) is carried out for a period between 40 minutes and 5 hours.

14. The process according to claim 1, wherein said intermediate heating step is carried out at a temperature between 30 and 80° C. for a period between 7 and 35 minutes.

15. The process according to claim 1, wherein the rate of progress of said second precipitation step a') is between 1 and 60.

16. The process according to claim 1, wherein the second precipitation step a') is carried out at a temperature between 45 and 70° C., for a period of 7 to 40 minutes.

17. The process according to claim 1, wherein heat treatment step f) is carried out at a temperature between 540° C. and 850° C. for a period of between 2 hours and 10 hours.

18. The process according to claim 1, wherein first precipitation step a) is carried out at a temperature between 20 and 40° C.

19. The process according to claim 1, in which the mass ratio of said basic precursor to said acidic precursor is between 1.84 and 2.05.

20. The process according to claim 1, wherein the amorphous mesoporous alumina obtained by said process has a connectivity (Z) greater than 2.7, the connectivity being determined from nitrogen adsorption/desorption isotherms.

21. The process according to claim 5, wherein the amorphous mesoporous alumina obtained by said process has a connectivity between 3 and 7.

22. The process according to claim 5, wherein the amorphous mesoporous alumina obtained by said process has a BET specific surface between 50 and 450 m$^2$/g.

23. The process according to claim 5, wherein the amorphous mesoporous alumina obtained by said process has a mesopore volume greater than or equal to 0.5 ml/g measured from the nitrogen saturation adsorption isotherm.

24. A process for preparing amorphous mesoporous alumina, said process comprising:
- a) a first alumina precipitation, in an aqueous reaction medium, of at least one basic precursor selected from sodium aluminate, potassium aluminate, ammonia, sodium hydroxide and potassium hydroxide, and at least one acidic precursor selected from aluminum sulphate, aluminum chloride, aluminum nitrate, sulphuric acid, hydrochloric acid, and nitric acid, in which at least one of the basic or acidic precursor comprises aluminum, the relative flow rate of the acidic and basic precursors is chosen so as to obtain a pH of the reaction medium between 8.5 and 10.5, and the flow rate of the acidic and basic precursor or precursors containing aluminum is regulated so as to obtain a rate of progress between 40 and less than 100%, the rate of progress being defined as the proportion of alumina formed as $Al_2O_3$ equivalent during the first precipitation a) with respect to the total amount of alumina formed at the end of a second precipitation a'), wherein said first precipitation a) is carried out at a temperature between 10 and 40° C. and for a period between 2 minutes and 30 minutes, wherein the first precipitation a) produces a suspension,
  wherein second precipitation a') is performed after the first precipitation a), and, between the first and second precipitations a) and a') the suspension obtained at the end of first precipitation a) is heated in an intermediate heating step carried out at a temperature between 20 and 90° C. and for a period of between 7 and 45 minutes, and the second precipitation a') is performed on the suspension obtained at the end of the intermediate heating step by adding to said suspension at the end of the intermediate heating step at least one basic precursor selected from sodium aluminate, potassium aluminate, ammonia, sodium hydroxide and potassium hydroxide and at least one acidic precursor selected from aluminum sulphate, aluminum chloride, aluminum nitrate, sulphuric acid, hydrochloric acid, and nitric acid, in which at least one of the basic or acidic precursors contains aluminum, the relative flow rate of the acidic and basic precursors is chosen so as to obtain a pH of the reaction medium between 8.5 and 10.5 and the flow rate of the acidic and basic precursor or precursors containing aluminum is regulated so as to obtain a rate of progress of the second precipitation a') between 0 and 60%, the rate of progress of the second precipitation a') being defined as the proportion of alumina formed as $Al_2O_3$ equivalent during second precipitation a') with respect to the total amount of alumina formed at the end of second precipitation a'), second precipitation a') being carried out at a temperature between 40 and 90° C., and for a period of between 2 minutes and 50 minutes, wherein in the first and second precipitations a) and a') the mass ratio of said basic precursor to said acidic precursor is between 1.6 and 2.05, b) a heat treatment step wherein the suspension obtained at the end of the second precipitation a'), is heated at a temperature between 50 and 200° C. for a period between 30 minutes and 5 hours, c) a filtration step wherein the suspension obtained at the end of the heat treatment step b) is filtered and an alumina gel is obtained, followed by at least one washing step of the obtained gel, d) a drying step wherein the alumina gel obtained at the end of the step c) is dried to obtain a powder, e) a molding step wherein the powder obtained at the end of the step d) is molded to obtain crude material, and f) a heat treatment step wherein the crude material obtained at the end of the step e) is heated at a temperature between 500 and 1000° C., in the presence or otherwise of a stream of air containing up to 60% by volume of water.

* * * * *